United States Patent [19]

Keyes et al.

[11] 3,726,441
[45] Apr. 10, 1973

[54] DISTRIBUTOR FOR FRAGILE PARTICULATE MATERIALS

[75] Inventors: Richard E. Keyes, Ralph E. Lingert, both of Cincinnati, Ohio

[73] Assignee: The Finn Equipment Comapny, Cincinnati, Ohio

[22] Filed: Mar. 19, 1971

[21] Appl. No.: 126,050

[52] U.S. Cl..................................222/178, 239/77
[51] Int. Cl...............................................A01c 15/04
[58] Field of Search.........................239/77, DIG. 6; 222/176, 178; 118/308; 302/52

[56] References Cited

UNITED STATES PATENTS

| 2,908,994 | 10/1959 | Jedrzykowski | 239/77 |
| 3,446,424 | 5/1969 | Wolford | 239/77 X |
| 2,708,596 | 5/1955 | Weller | 239/77 |
| 2,655,406 | 10/1953 | Loy et al. | 239/77 X |
| 2,930,334 | 3/1960 | Marron et al. | 222/178 X |
| 2,974,963 | 3/1961 | McBride | 222/178 X |
| 2,986,336 | 5/1961 | Sharkey | 239/77 |
| 3,335,916 | 8/1967 | Juniper | 222/176 |

Primary Examiner—Samuel F. Coleman
Assistant Examiner—John P. Shannon
Attorney—J. Warren Kinney, Jr.

[57] ABSTRACT

The distributor of fragile particulate materials includes a blower, a hopper for particulate material, and a venturi tube assembly arranged to receive the material from the hopper and broadcast the material substantially uniformly over an extensive area, with the aid of air as the dispersal vehicle, applied in a manner such as to ensure deposit of the material upon said area in practically its original form and without substantially reducing the material to powder or granules.

8 Claims, 6 Drawing Figures

INVENTOR
RICHARD E. KEYES
RALPH E. LINGERT

BY *J Warren Kinney*

ATTORNEY

INVENTOR
RICHARD E. KEYES
RALPH E. LINGERT

BY *Jevanen Kinney*

ATTORNEY

DISTRIBUTOR FOR FRAGILE PARTICULATE MATERIALS

BACKGROUND OF THE INVENTION

Serious problems of physiological ecology have arisen with alarming frequency, as the result of oils and similarly contaminative materials appearing on bodies of water, and on land areas as well, often by reason of accidents or lack of adequate care in transporting or using such materials, or in accomplishing its extraction from the earth. Offshore oil well drilling, as well as land based well drilling and storage, and the release of oil from tankers and other ships and carriers, have been common contributors to the problem. As is well known, oily contaminants floating on bodies of water have been destructive of animal and plant life to such an alarming degree as to attract national and worldwide attention. The problem is widely recognized also on land where such contamination occurs.

Heretofore offered as a solution to the problems aforesaid, has been the dispersal of numerous small beads of foam glass over a contaminated surface, which beads have the ability to absorb and retain oily substances. The beads, sometimes referred to as "seabeads", are formed readily from foam glass as substantially spherical bodies approximating in size the dimensions of small garden peas, and said bodies are of a low specific gravity such as to ensure their floating on the surface of water.

In the light of the foregoing explanation, it should be understood that the particulate material, or seabeads, if dispersed uniformly over an oily surface of either land or water, will stand thereon and absorb and retain the oily substance, and when saturated therewith the beads may be harvested and disposed of in any suitable manner, leaving the previously contaminated surface clean and wholesome.

The beads or particles when loaded with a combustible oil, may be ignited on the site of use when practicable, the beads serving as indestructible wicks aiding combustion. After combustion is completed, the beads may be harvested for re-use, by gathering them in any suitable manner from the land or water surface thereby cleared.

SUMMARY OF THE INVENTION

The present invention relates to equipment or mechanical means best suited for the effective, economical, and convenient dispersal or distribution of seabeads or other materials, uniformly over an extensive area, without subjecting such beads or materials to a high degree of comminution that might render harvesting and re-use thereof impractical. Otherwise stated, the distributing equipment of the invention is so constructed as to project the beads or particulates gently and without crushing or impacting.

According to the present invention, the material to be distributed is to be propelled or projected principally by force of a cushioning air stream, rather than by mechanical impact, in order to preserve the original bead formation of the material. It is in this respect chiefly that the device of the present invention is distinguished from materials distributors of the prior art.

Although the present device is adapted especially for the distribution of fragile particulates, it may be employed as well in distributing other less fragile materials, for example, wood chips, compost materials, fertilizers or the like. Distribution may be effected over either land or water surfaces, as may be required.

THE PREFERRED EMBODIMENTS

Figure 1:
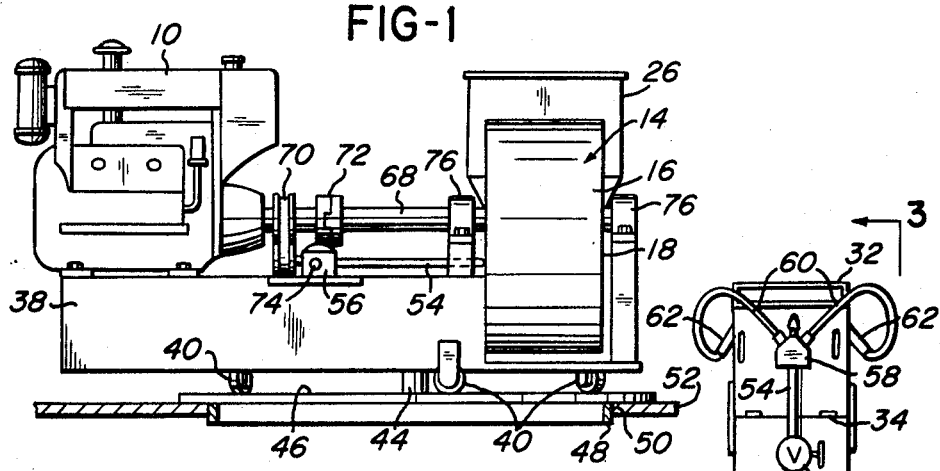
FIG. 1 is a side elevational view of a distributor incorporating the present invention, powered by way of example by an internal combustion engine.
Figure 2:
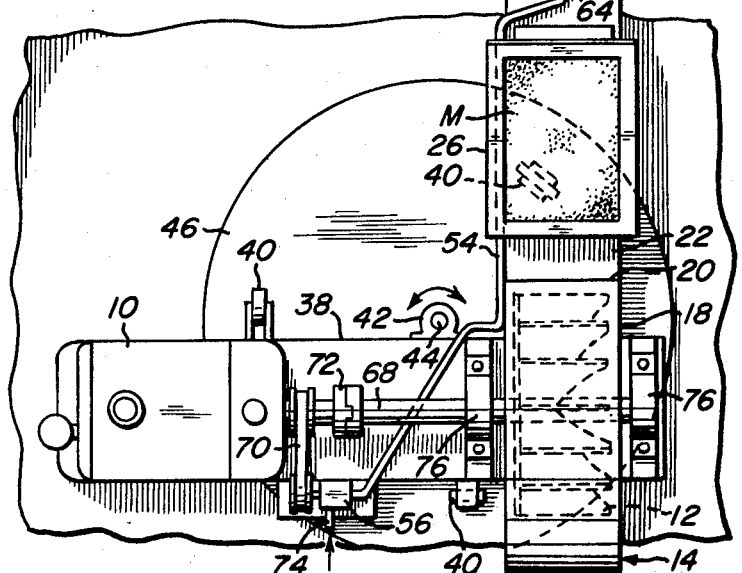
FIG. 2 is a top plan view of FIG. 1.

In all of the drawing views, a suitable internal combustion engine 10 is arranged to drive the rotor 12 of an air-moving fan or blower 14, which includes a housing 16 having an air intake port 18 and an air discharge port 20. The engine or driving means, of course, may be a motor of another type if desired.

Figure 4:
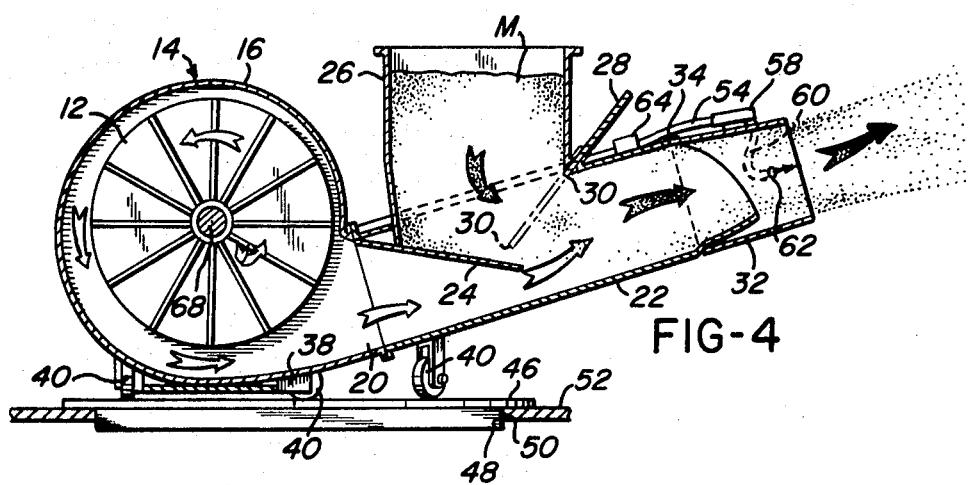
FIG. 4 is a vertical cross-section of FIG. 3.

The air discharge port 20 (FIG. 4) discharges into an elongate tube 22 in which is incorporated a venturi formed by a sloping plate 24, which plate acts to constrict and compress the flow of air from port 20 in order to produce the venturi effect needed for sucking particulate material M from the partially open bottom of a hopper 26 mounted upon tube 22. The amount of material released from the hopper may be controlled by providing any suitable type of valve or gate at the hopper bottom. In the example illustrated, the valve or gate is denoted 28 and comprises a slidable plate having a forward edge 30 movable toward and from the hopper bottom plate 24, to regulate flow of material from the hopper.

The tube 22 may be inclined upwardly and outwardly as shown, and its outer open end may be provided with a movable spout 32 hinged at 34, whereby the trajectory and distance of material discharge may be controlled. The spout, if desired, may be in the form of a flexible tube as suggested at 36 in FIGS. 5 and 6.

In that form of the device illustrated by FIGS. 1 through 4, the blower housing and motor 10 are mounted upon a bed or frame 38 which may be supported upon a series of rollers 40. A pivot journal 42 (FIG. 2) secured to bed or frame 38, accommodates an upright stationary pivot shaft 44 which serves as a guide whenever an operator rotates the bed or frame in directing the flow of material discharge laterally. Rollers 40 may ride upon a suitable base plate 46, if desired, or upon my appropriate supporting surface.

Base plate 46 as shown by way of example, may be a heavy metallic disc having a depending member or flange 48 to be accommodated in a circular opening 50 of a ship's deck 52, or other basic support means for the apparatus. When used for the control of waterborne oily substances, the apparatus usually will be carried by some form of watercraft. When used on land, the apparatus may be mounted upon a truck or other portable conveyance.

It is sometimes considered desirable to wet or coat the discharged material as it leaves the spout 32, depending upon the conditions prevailing at the site of use of the apparatus. In the case of water-borne oil control or removal, the effectiveness of use of seabeads may be enhanced by wetting the discharge with one of several oily agents, such as kerosene, diesel fuel, or the like. The wetting agent may serve to facilitate combustion of the oil to be removed from a water surface, or it may preclude any tendency of the seabeads to undesirably absorb water, rather than oil, during the absorption process.

Figure 3:
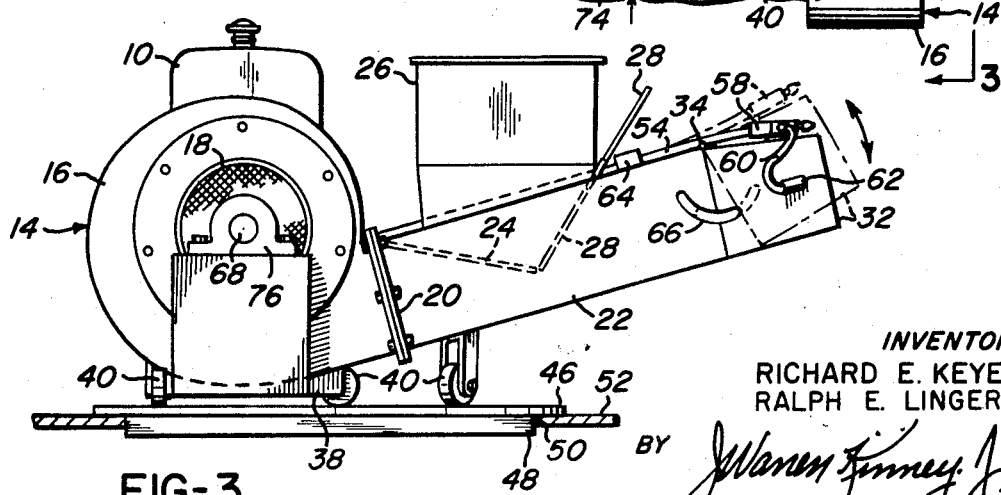
FIG. 3 is a side elevation taken on line 3—3 of FIG. 2.

To wet the material undergoing discharge through spout 32, the structure may include a feed pipe 54 (FIG. 2), having at its rear end a pump 56 and at its forward end a manifold 58. The manifold may include a pair of branch pipes 60, 60 each terminating in a nozzle 62, 62, said nozzles being located at opposite sides of spout 32 to direct a mist or fine steam of wetting fluid into the path of discharge of the air-borne particulate material. The wetting fluid may be under the control of a valve 64 connected in feed pipe 54. The feed pipe between valve 64 and manifold 58 may be made flexible, to permit manipulation of spout 32 about its hinge connection 34. In FIG. 3, the reference numeral 66 indicates a lockable handle of any approved type, for fixing spout 32 in adjusted positions.

Pump 56 may be driven from main shaft 68 in any suitable manner, as by means of pulleys and a belt 70. The pump drive may include a clutch, not shown, for selectively activating the pump depending on whether or not the operator wishes to wet the particulate material discharging through spout 32. The reference numeral 72 denotes a clutch associated with drive shaft 68, to control the rotor 12. If desired, the pump drive may be located between clutch 72 and rotor 12, so as to effect activation of the pump and the rotor simultaneously when clutch 72 is engaged.

Pump 56 has an inlet tube 74 (FIG. 2), to which may be attached a hose or flexible conduit adapted to suck wetting fluid from a nearby drum, reservoir or other source of supply, not shown. If desired, the drum or reservoir may be carried by bed or frame 38. In any event, the wetting fluid is pumped to the nozzles 62, 62, where atomization or spraying is to occur.

As was previously suggested, the wetting fluid may be an oil of a selected viscosity; however, if the apparatus is to be used for distributing such materials as wood chips, composted materials, fertilizers, seed or the like, the wetting fluid may be water or a water-based solution.

The reference numerals 76, 76 denote suitable bearings for the support of shaft 68.

Figure 5:
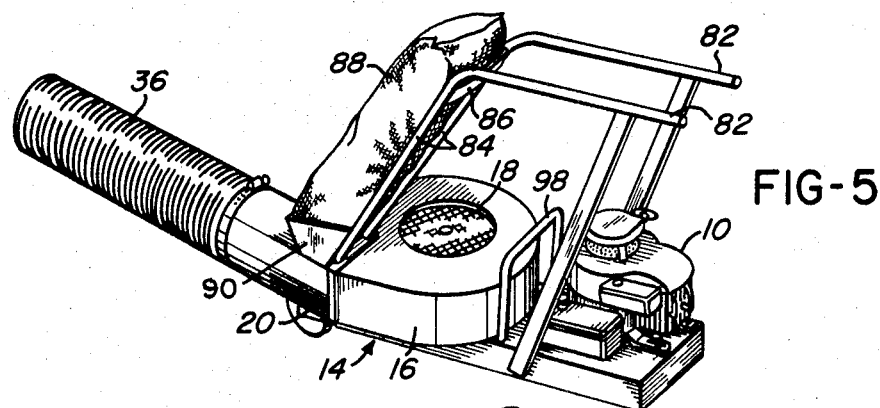
FIG. 5 is a perspective view of a modification, characterized by portability and minimal weight and size features.
Figure 6:
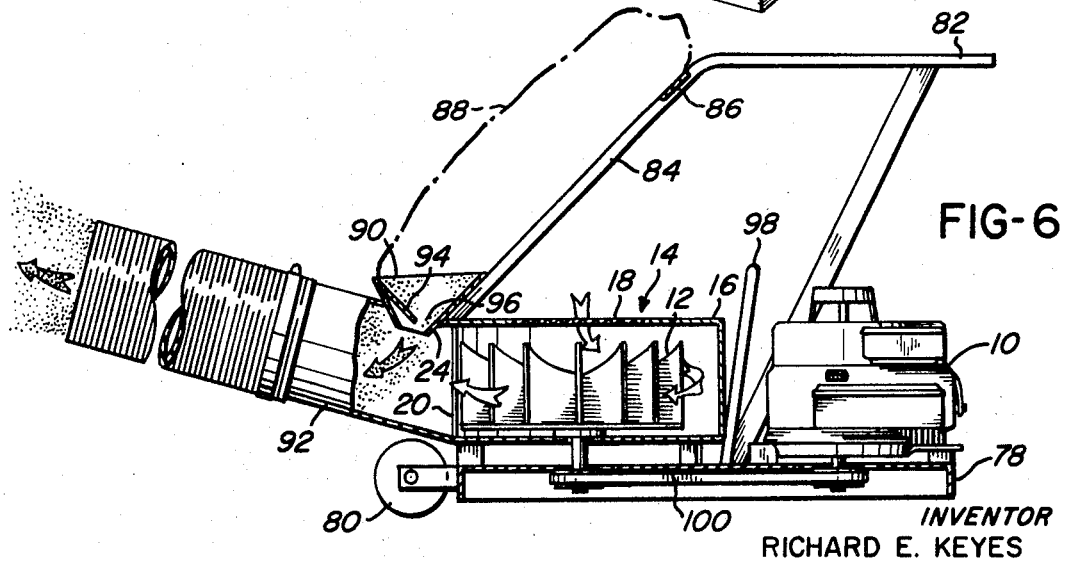
FIG. 6 is a vertical cross-section of the FIG. 5 device.

The modified apparatus of FIGS. 5 and 6 may be quite similar to the apparatus heretofore described, but is preferably greatly reduced in size and weight to render it easily portable. Accordingly, a smaller and lighter motor 10 is employed for driving a smaller blower 14, and the bed or frame 78 is light in weight. Frame 78 may be provided at its forward end with one or more rollers 80, and with a pair of guide handles 82, 82 to be grasped by an operator for advancing the apparatus along a surface supporting the roller means 80.

The handles 82 may include riser portions 84 connected together by one or more transverse struts 86, to provide support for a bag or container 88 of particulate material to be distributed. The lower open end of the bag or container is adapted to rest within the open top of a small hopper or receptacle 90 supported on tube 92 which corresponds to the venturi tube 22 of FIG. 4. The oblique wall 24 of hopper 90 forms a venturi in tube 92, which acts to suck particulate material from the lower open end of bag 88 and project it through the flexible spout 36.

The small hopper or receptacle 90 may include a valving member or plate 94 to govern the flow of particulate material released to the air stream generated by blower element 12; and if desired, said plate 94 may be disposable to various positions of adjustment for varying the output of material through orifice 96. The apparatus of FIGS. 5 and 6 may be provided with wetting equipment, if desired, corresponding substantially to the wetting equipment previously disclosed in describing FIGS. 1 through 4.

At 98 is indicated a lifting handle fixed approximately at the center of gravity of the apparatus, whereby an operator may manually lift the machine bodily and carry it from place to place. The apparatus of FIGS. 5 and 6 need not weigh more than about 65 pounds. In the embodiment illustrated by way of example, the motor 10 may drive the blower element by means of a pulley and belt transmission means 100 located beneath the bed or frame 78. Other forms of drive means may be employed as desired.

The apparatus herein disclosed has proven highly effective and economical in distributing with great uniformity, various materials such as seabeads, composted materials, wood chips and other particulate materials. Since the materials are projected strictly by means of a gentle air stream, and without mechanical impact, those materials which are frangible, as are seabeads, will not be crushed or mutilated in the process of distribution. Such materials therefore may be reclaimed and re-used after having performed their intended function or functions hereinbefore recited.

What is claimed is:

1. An easily lifted and hand portable distributor for evenly distributing particulate materials onto a surface, comprising a generally horizontal, lightweight frame means, a motor mounted on and carried by said frame means adjacent one end thereof, a blower means mounted on and carried by said frame means adjacent the other end of said frame means, drive means interconnecting the motor and blower means for driving said blower means to generate an airstream, said blower means including a housing having an air intake port and an air outlet port, a discharge tube connected at one end to said housing in communication with said outlet port and having a delivery end at the other end thereof for discharge of said airstream to atmosphere, a hopper means supported on said discharge tube adjacent the outlet port in said housing, an opening in the top of said discharge tube, the hopper means having an open bottom received in said opening for discharge of particulate material from said hopper means into the airstream in said discharge tube, upstanding handle means connected to said frame means and including upwardly extending portions adjacent said hopper means for supporting a container resting on said hopper means, said handle means including portions to be grasped by an operator for advancing the distributor along a surface, and lifting handle means secured to said frame means between the motor and blower means in a position to be readily grasped by an operator for bodily lifting the distributor and carrying it from place to place.

2. The distributor as defined by claim 1, wherein said hopper orifice is adjustable as to size.

3. The distributor as defined in claim 1, wherein is included a movable spout at the delivery end of the discharge tube, for selectively altering the trajectory of said air-borne particles.

4. A distributor for evenly distributing particulate materials onto a surface, comprising a generally horizontal frame means, a motor mounted on and carried by said frame means adjacent one end of said frame means, a blower means mounted on and carried by said frame means adjacent the other end of said frame means, drive means interconnecting said motor means and said blower means for driving said blower means to generate an airstream, said blower means including a housing having an air intake port and an air outlet port, an elongate, tubular discharge tube connected to said housing at one end thereof in communication with said outlet port and having a delivery end at the other end thereof for discharge of said airstream to atmosphere, hopper means supported on and carried by said discharge tube adjacent the outlet port of said housing, said discharge tube having an opening in the top thereof extending across substantially the entire width of said discharge tube, said hopper having an open bottom received through the opening in said discharge tube and of substantially the same size as the opening in said discharge tube, a venturi in said discharge tube at the bottom of said hopper to draw particulate material from said hopper and into the airstream for discharge of the particulate material through the delivery end of the discharge tube and onto a surface, said venturi defined by the bottom of said hopper extended into said discharge tube toward the bottom of said discharge tube to constrict the area of said discharge tube at the open bottom of said hopper, wheeled means at said other end of the frame to render the distributor tractional on said means when the other end of the frame has been elevated from a supporting surface, and handle means extending upwardly and rearwardly of the frame at a location above the motor and blower, said handle means terminating in a hand grip portion by which that end of the frame opposite the wheeled means may be lifted from a supporting surface for transporting the distributor on said wheeled means.

5. A distributor as called for in claim 4, wherein a portion of said handle means provides a support for a bag from which material is delivered to the hopper.

6. A distributor as called for in claim 4, wherein said handle means include a pair of laterally spaced members each having a forward riser portion inclined upwardly and rearwardly from the hopper adjacent the outlet port of the housing, and another portion which terminates in said hand grip portion, and wherein said riser portions constitute a support for a bag from which material is delivered into the hopper.

7. A distributor for according distributing particulate materials onto a surface, comprising a generally horizontal frame means, a motor mounted on and carried by said frame means adjacent one end of said frame means, a blower means mounted on and carried by said frame means adjacent the other end of said frame means, drive means interconnecting said motor means and said blower means for driving said blower means to generate an air stream, said blower means including a housing having an air intake port and an air outlet port, an elongate, tubular discharge tube connected to said housing at one end thereof in communication with said outlet port and having a delivery end at the other end thereof for discharge of said air stream to atmosphere, hopper means supported on and carried by said discharge tube adjacent the outlet port of said housing, said discharge tube having an opening in the top thereof extending across substantially the entire width of said discharge tube, said hopper having an open bottom received through the opening in said discharge tube and of substantially the same size as the opening in said discharge tube, a venturi in said discharge tube at the bottom of said hopper to draw particulate material from said hopper and into the airstream for discharge of the particulate material through the delivery end of the discharge tube and onto a surface, said venturi defined by the bottom of said hopper extended into said discharge tube toward the bottom of said discharge tube to constrict the area of said discharge tube at the open bottom of said hopper, and hand grip means secured to and extending upwardly from said frame at a location intermediate said motor and blower for rendering said distributor portable and transportable when suspended from said hand grip means.

8. A distributor for evenly distributing particulate materials onto a surface, comprising a generally horizontal frame means, a motor mounted on and carried by said frame means adjacent one end of said frame means, a blower means mounted on and carried by said frame means adjacent the other end of said frame means, drive means interconnecting said motor means and said blower means for driving said blower means to generate an air stream, said blower means including a housing having an air intake port and an air outlet port, an elongate, tubular discharge tube connected to said housing at one end thereof in communication with said outlet port and having a delivery end at the other end thereof for discharge of said air stream to atmosphere, hopper means supported on and carried by said discharge tube adjacent the outlet port of said housing, said discharge tube having an opening in the top thereof extending across substantially the entire width of said discharge tube, said hopper having an open bottom received through the opening in said discharge tube and of substantially the same size as the opening in said discharge tube, a venturi in said discharge tube at the bottom of said hopper to draw particulate material from said hopper and into the air stream for discharge of the particulate material through the delivery end of the discharge tube and onto a surface, said venturi defined by the bottom of said hopper extended into said discharge tube toward the bottom of said discharge tube to constrict the area of said discharge tube at the open bottom of said hopper, wheeled means at one end of the frame to render the distributor tractional on said means when the other end of the frame has been elevated from a supporting surface, and handle means extending upwardly and rearwardly of the frame at a location above the motor and blower, said handle means terminating in a hand grip portion by which that end of the frame opposite the wheeled means may be lifted from a supporting surface for transporting the distributor on said wheeled means.

* * * * *